United States Patent [19]
McNab

[11] 3,751,299
[45] Aug. 7, 1973

[54] METHOD OF MANUFACTURING BATTERY PLATES

[75] Inventor: John Henry McNab, Solihull, England

[73] Assignee: Joseph Lucas (Industries Limited, Birmingham, England

[22] Filed: May 10, 1971

[21] Appl. No.: 141,819

[30] Foreign Application Priority Data
May 28, 1970 Great Britain.................. 25,668/70

[52] U.S. Cl. ....................................... 136/9, 136/31
[51] Int. Cl. ......................................... H01m 35/08
[58] Field of Search.............. 136/67, 19, 64, 75–76, 136/36, 20, 120, 9, 24, 31, 35, 29, 27, 125–127; 264/104, 111

[56] References Cited
UNITED STATES PATENTS

| 417,088 | 12/1889 | Pumpelly | 136/67 |
|---|---|---|---|
| 1,092,252 | 4/1914 | Fuller et al. | 136/67 |
| 1,303,513 | 5/1919 | Spencer | 136/67 |
| 2,987,567 | 6/1961 | Freas et al. | 136/9 |
| 2,865,974 | 12/1958 | Scheuerle et al. | 136/30 |

*Primary Examiner*—Anthony Skapars
*Attorney*—Holman & Stern

[57] ABSTRACT

In a method of manufacturing a battery plate for an electric storage battery a conductive grid is placed into a mould, the grid being provided with a plurality of projections so that the surface of the grid adjacent the mould is spaced from the mould and the metal from which the plate is to be formed is inserted in powder form into the mould so as to cover the grid and fill the spaces between the grid and the mould. The powder in the mould is treated with an acid which firstly removes the oxide film from the particules of the powder secondly causes the powder to swell, the particles of the powder becoming united with each other and the grid by cold welding. The swollen powder is finally pressed to the required size.

3 Claims, 2 Drawing Figures

PATENTED AUG 7 1973　　　　　　　　　　　　　3,751,299

INVENTOR
John Henry McNab

METHOD OF MANUFACTURING BATTERY PLATES

This invention relates to a method of manufacturing battery plates for electric storage batteries.

A method according to the invention, comprises the steps of placing a conductive grid into a mould, the grid being provided with a plurality of projections so that the surface of the grid adjacent the mould is spaced from the mould, inserting the metal from which the plate is to be formed in powder form into the mould so as to cover the grid and fill the spaces between the grid and the mould, treating the powder in the mould with an acid which firstly removes the oxide film from the particles of the powder and secondly causes the powder to swell, the particles of the powder becoming united with each other and the grid by cold welding, and finally pressing the swollen powder to the required size.

The invention further resides in a battery plate manufactured by a method described in the preceding paragraph.

Figure 1:
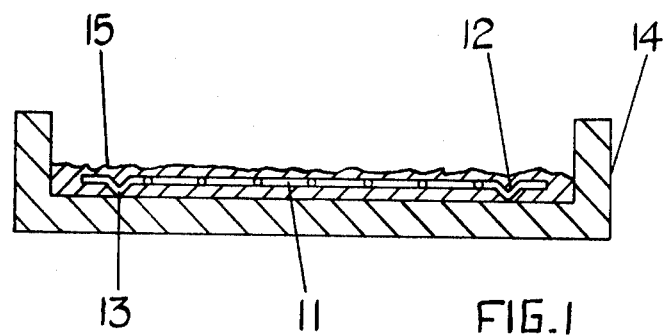
Figure 2:
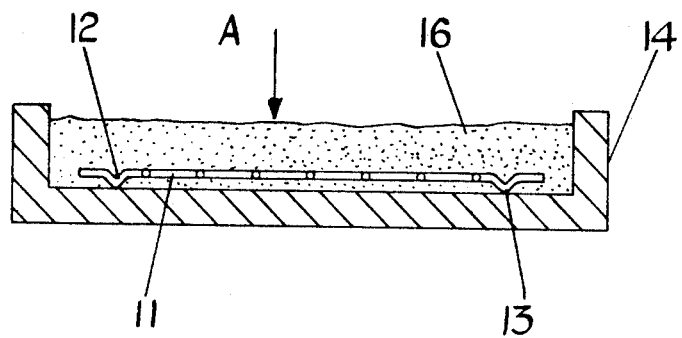

In the accompanying drawings,

FIGS. 1 and 2 are sectional views illustrating two stages respectively of a method according to one example of the invention.

Referring to the drawings, in the example shown it is required to produce a zinc battery plate and accordingly a mild steel expanded mesh grid 11 having an overall thickness of 0.020 inches is formed with a plurality of indentations 12 in one surface of the grid. The formation of the indentations in the grid provides complementary projections 13 integral with the other surface of the grid, the grid then being placed in a mould 14 so that the projections 13 on the other surface of the grid engage the mould 14 to space the remainder of the grid from the mould. The grid is now covered with a zinc powder 15 of mean particle size 6 microns, such as that sold by the Imperial Smelting Company under the trade name Delaville Microfine. The zinc powder 15 passes through the grid to fill up the spaces defined between the mould and the grid, the powder being added until the grid is completely covered by the powder and equal quantities of the powder lie on each side of the grid.

Hydrochloric acid is then added evenly to the zinc powder 15, the hydrochloric acid firstly removing the oxide film from the zinc powder and then reacting with the zinc, to produce hydrogen. As soon as the oxide film is removed from the zinc particles, the particles become cold welded together and to the grid due to the mutual contact of the very clean surfaces so produced, and the hydrogen causes the welded powder to swell into a sponge-like structure 16 (FIG. 2). After swelling of the powder 15 to produce the structure 16, pressure is applied to the structure, in the direction of arrow A in FIG. 2, to form the structure into a battery plate of the required size, whereafter the finished plate is removed from the mould and is washed and dried.

It is to be appreciated that other metal powders than zinc could be used with the above method to form battery plates, in which case other acids than hydrochloric acid might prove more suitable for treating the powders.

It is also to be appreciated that the projections are provided on the grid to hold the grid in a stable, spaced relationship with the mould and so it is possible that the projection could be arranged to be interconnected so as to form a single continuous rib, such as a square rib, which would still provide the necessary support for holding the grid in a stable, spaced relationship with the mould.

I claim:

1. A method of manufacturing a battery plate for an electric storage battery, comprising the steps of placing a conductive grid into a mould, the grid being provided with a plurality of projections whereby the surface of the grid adjacent the mould is spaced from the mould, inserting the metal from which the plate is to be formed in powder form into the mould, the metal powder covering the grid and filling the space between the grid and the mould, treating the powder in the mould with an acid which firstly removes the oxide film from the particles of the powder and secondly causes the powder to swell, the particles of the powder becoming united with each other and the grid by cold welding, and finally pressing the swollen powder to the required size.

2. A method as claimed in claim 1 wherein the grid is in the form of an expanded, metal mesh.

3. A method as claimed in claim 1 wherein the metal powder is zinc and the acid used to treat the powder is hydrochloric acid.

* * * * *